United States Patent [19]

Clements

[11] 4,190,232
[45] Feb. 26, 1980

[54] IRRIGATION PIPE GATE VALVE

[76] Inventor: Lloyd W. Clements, 49 W Lincoln Ave. (C), Woodland, Calif. 95695

[21] Appl. No.: 964,264

[22] Filed: Nov. 27, 1978

Related U.S. Application Data

[63] Continuation-in-part of Ser. No. 918,492, Jun. 23, 1978, abandoned, which is a continuation of Ser. No. 775,244, Mar. 7, 1977, abandoned.

[51] Int. Cl.$^2$ ............................................. F16K 31/58
[52] U.S. Cl. .................................. 251/145; 251/351; 137/625.38
[58] Field of Search ............... 251/145, 146, 353, 349, 251/351, 354, ; 137/625.3, 625.38; 239/542

[56] References Cited

U.S. PATENT DOCUMENTS

| | | | |
|---|---|---|---|
| 2,693,203 | 11/1954 | Hempel | 251/145 X |
| 2,901,211 | 9/1959 | Epp | 251/145 |
| 3,345,034 | 10/1967 | Sherman | 251/145 X |
| 3,794,294 | 2/1974 | Sherman | 251/145 |
| 3,837,619 | 9/1974 | Sherman | 251/145 |

*Primary Examiner*—William R. Cline
*Attorney, Agent, or Firm*—Klarquist, Sparkman, Campbell, Leigh, Hall & Whinston

[57] ABSTRACT

An irrigation pipe laying crosswise of a series of furrows has gate valves mounted in its side spaced to match each furrow. Each gate valve includes a generally elliptical, elastomeric, grommet-like frame fitting on the periphery of a recessed lip portion of the pipe defining an opening, and also includes a tubular slide slidable in the frame between a closed position and three open positions, one perpendicular to the pipe and two others cocked to either side to direct water to the outer of the three furrows.

8 Claims, 9 Drawing Figures

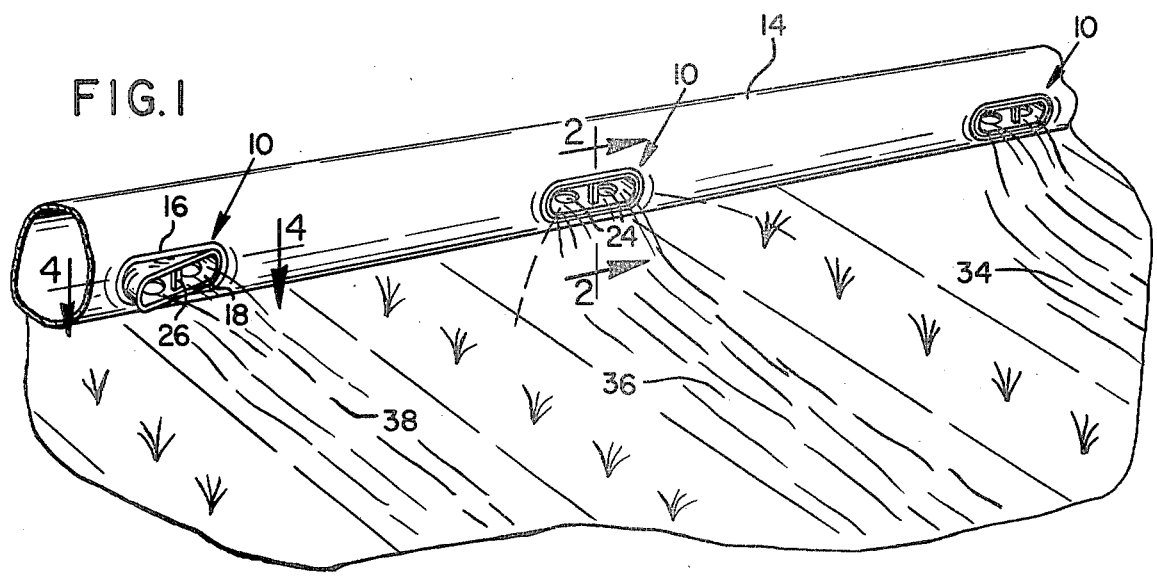
FIG. 1
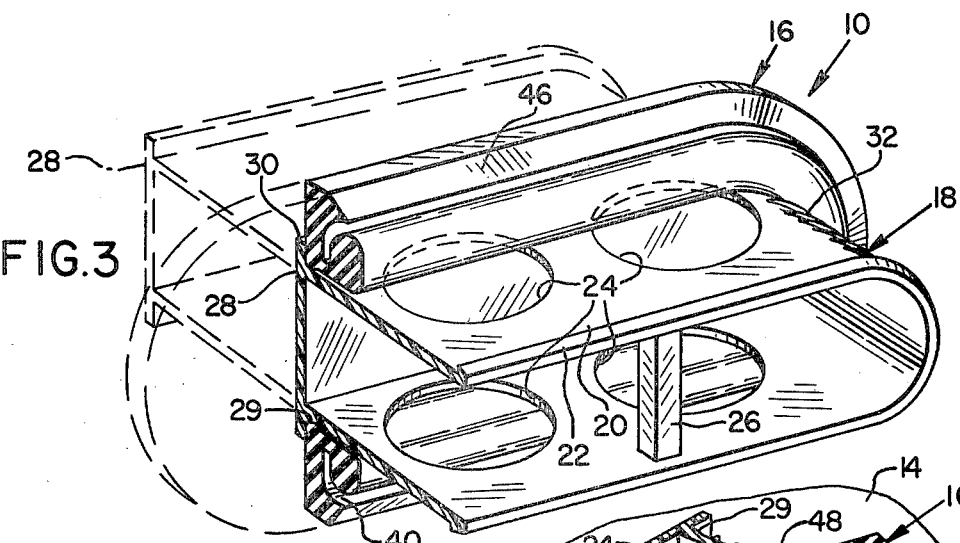
FIG. 3
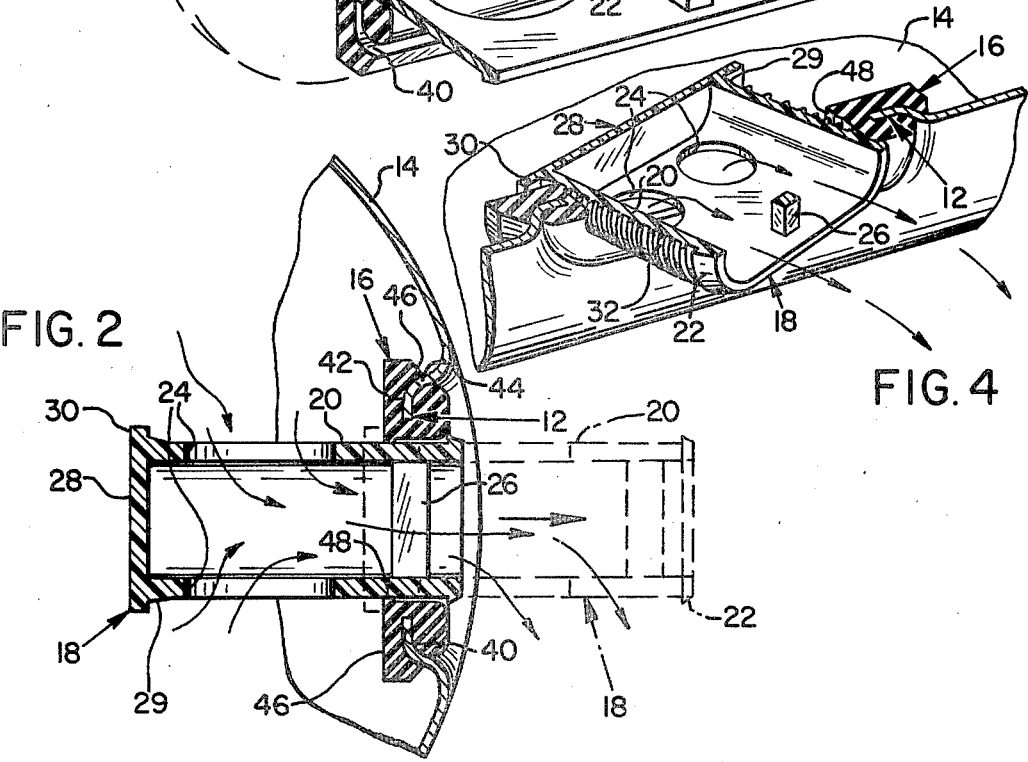
FIG. 2
FIG. 4

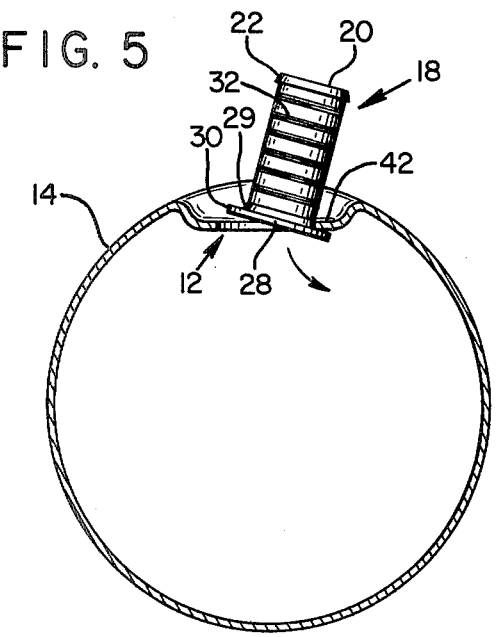
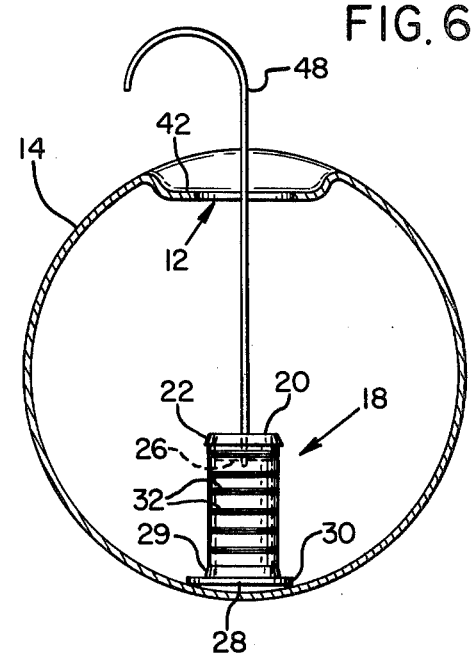
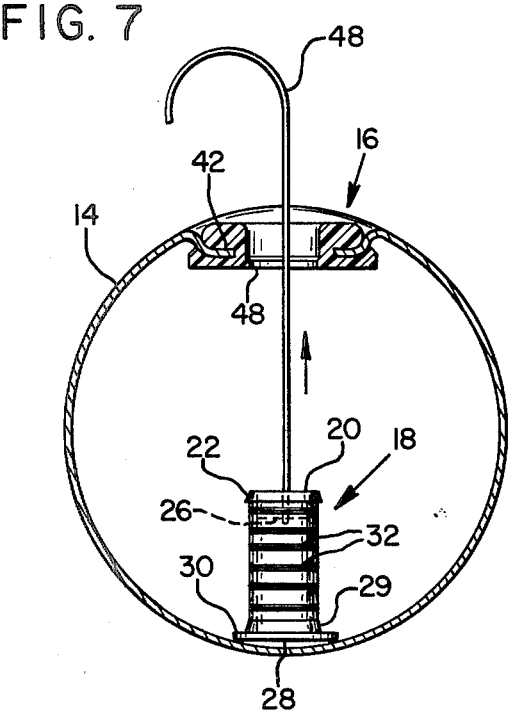
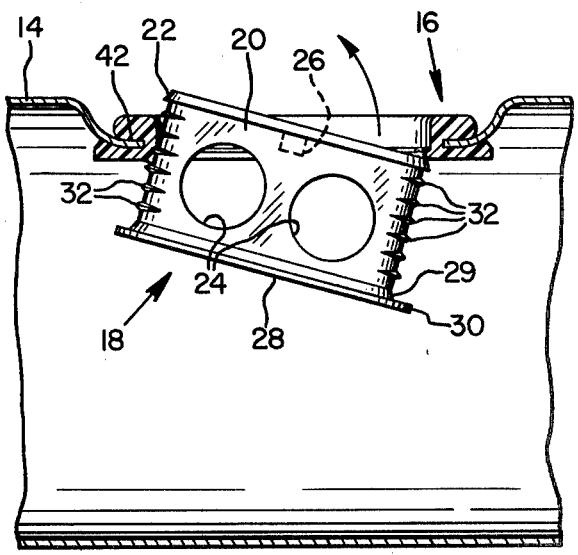

IRRIGATION PIPE GATE VALVE

RELATED APPLICATIONS

This is a continuation-in-part of co-pending application Ser. No. 918,492, filed June 23, 1978 (now abandoned), which is a continuation of application Ser. No. 775,244, filed Mar. 7, 1977 (abandoned).

DESCRIPTION

This invention relates to an improved irrigation pipe gate valve, and has for an object thereof the provision of a new and improved irrigation pipe gate valve.

Another object of the invention is to provide a gate valve which dissipates energy of water flow to minimize soil erosion.

A further object of the invention is to provide a gate valve which has a slide that can be cocked to divert water toward the center of the nearest furrow.

Another object of the invention is to provide a gate valve having a slide movable to an open position by vacuum in an irrigation pipe.

Another object of the invention is to provide a gate valve having a slide provided with stops preventing accidental closing by pressure of water.

Another object of the invention is to provide a gate valve having a resilient frame having a sealing lip allowing a slide to open easily but which will not creep toward a closed position.

Another object of the invention is to provide a gate valve slide which is elongated so that it can be inserted endwise through an opening in a frame, turned and pulled back into the opening with a tapered front end to facilitate its movement through the frame while preventing slide from being pushed back into the pipe.

Another object of the invention is to provide a gate valve mounted on a recessed lip portion of a pipe and in which no part of the slide extends beyond the pipe when a slide is in its open position.

Another object of the invention is to provide a gate valve having a slide adjustable to vary flow and with large passages to allow debris to pass therethrough.

In the drawings:

FIG. 1 is a fragmentary, perspective view of an irrigation pipe having a plurality of improved gate valves forming one embodiment of the invention;

FIG. 2 is an enlarged, fragmentary, vertical sectional view taken along line 2—2 of FIG. 1;

FIG. 3 is an enlarged, fragmentary, partially sectional, perspective view of one of the gate valves of FIG. 1;

FIG. 4 is an enlarged, fragmentary, horizontal sectional view taken along line 4—4 of FIG. 1;

FIGS. 5-8 are sectional views of the pipe and one of the valves being installed in the pipe.

Figure 9:
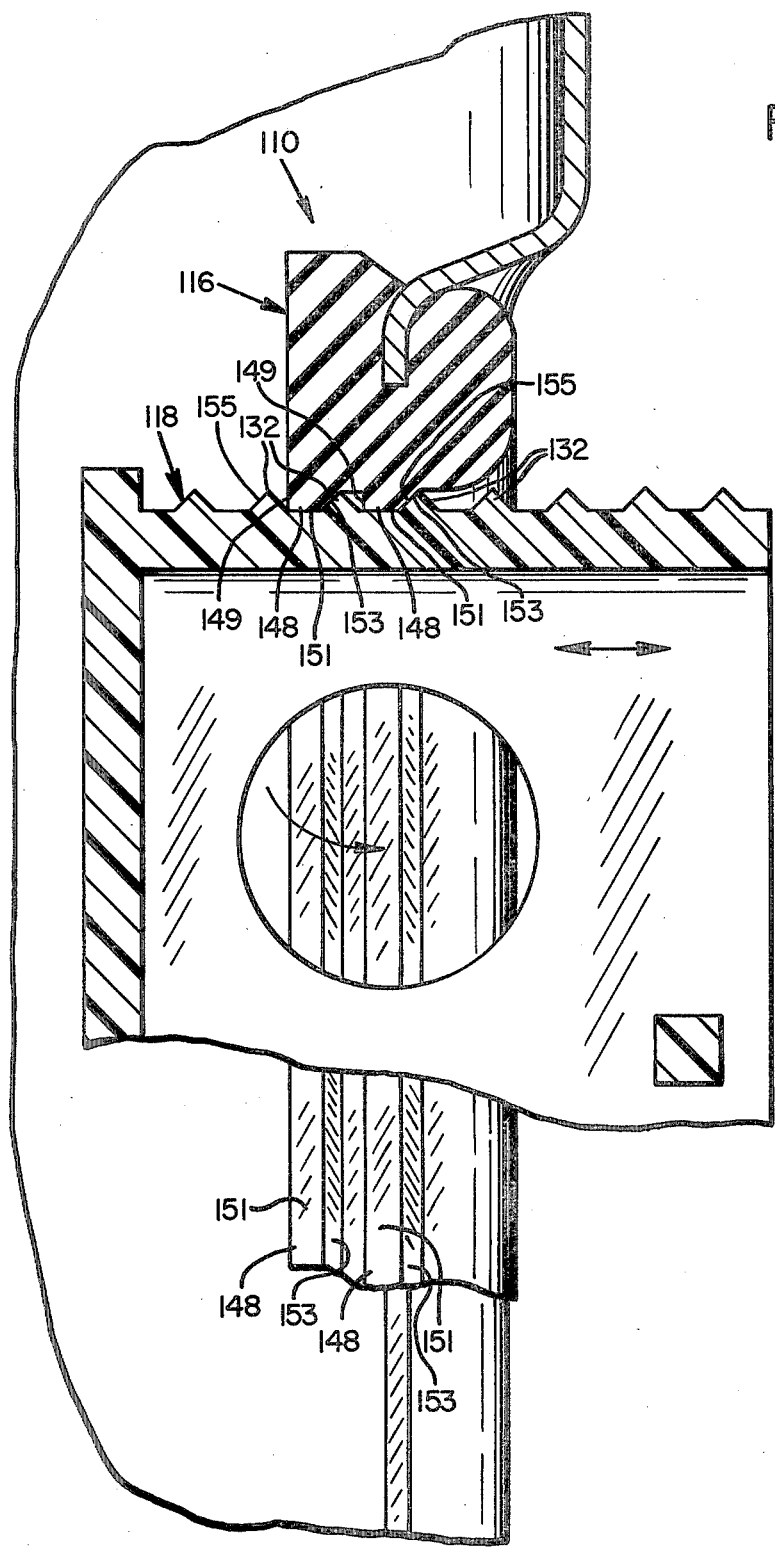
FIG. 9 is an enlarged, horizontal, sectional view of an improved gate valve forming an alternate embodiment of the invention.

Identical improved gate valves 10 forming specific embodiments of the invention are mounted in cup-like, recessed or indented opening portions 12 in an irrigation pipe 14. Each valve includes a softly resilient rubber or neoprene grommet-like frame 16 and a rigid slide 18 of a tough plastic, such as, for example, polyurethane. Each slide has a tubular body portion 20, which is generally elliptical in transverse cross-section, with a flange or lip 22 forwardly tapered to facilitate insertion of the slide through the frame, rear face of the flange 22 being abrupt to prevent accidentally pushing the slide inwardly out of the frame. The slide has two pairs of large, diametrically opposite circular inlet holes or ports 24, which admit water in opposed streams to somewhat dissipate its energy to help prevent soil erosion. A post-like handle 26 braces the elongated sides of the body 20. An inner end plate or bottom 28 closing the inner end of the slide has a somewhat wide flange 30, which acts as a valve closure member and as a stop to prevent outward movement of the slide out of the frame. Longitudinally spaced pairs of ribs 32 act as detent-like stops to hold the slide in selected positions of adjustment relative to the frame. The slide can be adjusted longitudinally relative to the frame to any of a large number of positions varying from fully open to fully closed. Also, the slide may be adjusted between a center position in which the slide is perpendicular to the frame and a cocked position directing the water at an acute angle to the pipe, as illustrated in FIG. 4, to direct the water toward the nearest of furrows 34, 36 and 38.

The frame 16 has an endless or generally annular, cup-shaped groove 40 fitting closely on and sealing to planar lip portion 42 and curved transition portion 44 of the indented opening 12. Bevelled lip portion 46 is pressed by water pressure tightly and sealingly against the curved transition portion 44. The frame has a planar inner face 46 and a narrow, thin sealing lip 48 fitting tightly on the body portion 20 of the slide.

To install the valve, with the frame 16, out of the opening 12, the lower edge of the flange 30 of the slide 18 is inserted into the opening 12, as shown in FIG. 5. Then the slide is pivoted to insert the rest of the flange into the opening and the slide is pushed fully into the pipe with a wire hook 60 attached to the slide, as shown in FIG. 6. Then the frame 16 is installed. With the components in the positions thereof shown in FIG. 7, the slide is pulled up by the wire hook, is cocked, and is partially drawn through the frame, as shown in FIG. 8. Then the outer end of the slide is snapped fully through the frame. The front locking edge 22 of the slide is wider than the opening in the frame so that it is very difficult to move the edge 22 straight through the opening in the frame.

The slide 18 will open under vacuum and prevent failure of the aluminum pipe due to a vacuum condition. The slide cannot be displaced toward closing under pressure due to the ribs 32 on the sides. The sealing lip 48 allows the slide to be opened easily, but is more difficult to close. This is an advantage since the slide wall will not "creep" to a closed position under gated pipe operating pressures. The tapered front edge 22 of the slide aids in easy installation. The slide has a wedge portion 29 adjacent the flange 30 to wedge into the frame to completely close the opening even under low water pressure.

Embodiment of FIG. 9

An improved gate valve 110 forming an alternate embodiment of the invention is identical to the gate valves 10, except that a grommet-like frame 116, which is like the frame 16, except that the frame 116 includes two semi-ratchet sealing lips 148 rather than the single semi-ratchet lip 48 of the frame 16 so that a slide 118 will stay in a set position at very high operating pressures. The lips 148 are spaced apart the same distance that each adjacent pairs of ribs 132 on the ends of the ellipse are spaced. To give the ratchet effect, each rib 148 has a planar, inner face 149, a land 151 and a bevelled, outer face 153 of substantially the same slope as inner sides 155 of the ribs 132. The width of each of the lands 151 is substantially the same as the distance between each adjacent pair of the ribs 132. The faces 149 are perpendicular to the longitudinal axis of the gate so that it is somewhat difficult to push the ribs 132 outwardly past the lands (in the closing direction) while it is much easier to push the ribs 132 inwardly in an opening direction. The grommet being of elastic material compresses to permit such movement.

What is claimed is:

1. In an irrigation pipe gate valve,
   a substantially rigid, generally elliptical tubular slide having shorter side portions and longer side portions with a plurality of parallel, spaced, exterior circumferential ribs at the shorter side portions thereof, an open outer end and a closed inner end and a plurality of generally circular openings in each of the longer side portions thereof and directly opposed to each other,
   the shorter side portions being imperforate,
   and a generally elliptical sealing frame of elastomeric material fitting closely on the slide and having an exterior circumferential groove adapted to receive the ribs,
   the frame having an inner lip engaging the slide and forming detents with the ribs,
   the slide being insertable edgewise through the frame,
   the slide having an outer flange at its closed end serving as a stop and being adapted to be moved through the frame only when the slide is edgewise to the frame.

2. The valve of claim 1 wherein the several ribs on each shorter side enable the slide to be cocked at an angle relative to the frame and held in such a cocked position.

3. The valve of claim 1 wherein the slide has a bar serving as a handle.

4. The valve of claim 1 wherein the slide has a tapered portion joining the flange to jam against the frame when the slide is in a closing position.

5. In an irrigation structure including a generally horizontal irrigation pipe having a generally elliptical opening disposed so that the major axis of the ellipse extends lengthwise of the pipe, the improvement comprising a gate valve including:
   a substantially rigid, generally elliptical tubular slide having shorter side portions and longer side portions, an open outer end and a closed inner end and a plurality of generally circular openings in each of the longer side portions thereof,
   the openings in one of the longer side portions being substantially directly opposed to the openings in the other of the longer side portions,
   the shorter side portions being imperforate,
   and a generally elliptical sealing frame of elastomeric material mounted in the opening in the pipe and fitting closely on the slide and having an exterior circumferential groove
   the slide being adjustable axially relative to the frame and the slide and the frame being provided with detent portions to hold the slide in adjusted position relative to the frame.

6. The irrigation structure of claim 5 wherein each of the shorter side portions has a plurality of parallel, spaced, circumferentially extending exterior detent ribs and the frame has an inner lip engaging the slide and the ribs to hold the slide against movement relative to the frame.

7. The irrigation structure of claim 6 wherein the closed inner end has a laterally outwardly extending flange and a filler wedge between the flange for jamming against the lip.

8. The irrigation structure of claim 5 wherein there are only two pairs of directly opposed openings in the longer side portions and the pairs of openings are spaced substantially closer to the closed end than to the open outer end.

* * * * *